US010963321B2

(12) United States Patent
Das et al.

(10) Patent No.: US 10,963,321 B2
(45) Date of Patent: *Mar. 30, 2021

(54) DISCOVERY AND CHAINING OF VIRTUAL FUNCTIONS

(71) Applicant: AT&T Intellectual Property I, L.P., Atlanta, GA (US)

(72) Inventors: Jayanta Das, Morganville, NJ (US); Rupam Choudhury, Manalapan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/584,992

(22) Filed: Sep. 27, 2019

(65) Prior Publication Data

US 2020/0026586 A1 Jan. 23, 2020

Related U.S. Application Data

(63) Continuation of application No. 15/133,629, filed on Apr. 20, 2016, now Pat. No. 10,430,258.

(51) Int. Cl.
*G06F 9/54* (2006.01)
*G06F 9/455* (2018.01)
*H04L 12/24* (2006.01)

(52) U.S. Cl.
CPC .......... *G06F 9/543* (2013.01); *G06F 9/45533* (2013.01); *H04L 41/12* (2013.01)

(58) Field of Classification Search
CPC . H04L 67/16; H04L 41/5054; H04L 41/0893; H04L 41/12
See application file for complete search history.

(56) References Cited

U.S. PATENT DOCUMENTS

| 8,074,218 | B2 | 12/2011 | Eilam et al. |
| 9,853,898 | B1* | 12/2017 | Subramanian ........ H04L 45/745 |
| 10,430,258 | B2* | 10/2019 | Das ........................ G06F 9/543 |
| 2014/0201374 | A1 | 7/2014 | Ashwood-Smith et al. |

(Continued)

OTHER PUBLICATIONS

Rajendran et al., "An Efficient WS-QoS Broker Based Architecture for Web Services Selection" (2010) International Journal of Computer Applications, vol. 1, No. 9, pp. 110-115 [retrieved from http://citeseerx.ist.psu.edu/viewdoc/download?doi= 10.1.1.184. 5781 &rep=rep1&type=pdf].

(Continued)

*Primary Examiner* — Brian W Wathen
(74) *Attorney, Agent, or Firm* — Hartman & Citrin LLC

(57) ABSTRACT

Concepts and technologies are disclosed herein for discovery and chaining of virtual functions. An application request can be received from a requestor. The application request can include a request to create an application. Based upon the application request, an application topology associated with the application can be determined. The application topology can define virtual functions and a data flow among the virtual functions. Creation of the plurality of virtual functions in a computing environment can be triggered and an indication of capabilities of the virtual functions can be received. The virtual functions can be chained together to provide functionality associated with the application.

20 Claims, 5 Drawing Sheets

(56) References Cited

U.S. PATENT DOCUMENTS

| | | |
|---|---|---|
| 2014/0280950 A1 | 9/2014 | Bhanujan et al. |
| 2014/0317261 A1 | 10/2014 | Shatzkamer et al. |
| 2015/0026362 A1* | 1/2015 | Guichard ............ H04L 45/30 |
| | | 709/242 |
| 2015/0082308 A1 | 3/2015 | Kiess et al. |
| 2015/0234725 A1 | 8/2015 | Cillis et al. |
| 2015/0288541 A1 | 10/2015 | Fargano et al. |
| 2015/0358248 A1 | 12/2015 | Saha et al. |
| 2016/0006696 A1 | 1/2016 | Donley et al. |
| 2016/0127169 A1 | 5/2016 | Rosa de Sousa Teixeira |
| 2016/0212017 A1 | 7/2016 | Li |
| 2016/0248860 A1 | 8/2016 | Dunbar |
| 2016/0277509 A1* | 9/2016 | Qiang ............... H04L 67/1002 |
| 2016/0294643 A1 | 10/2016 | Kim |
| 2016/0344803 A1 | 11/2016 | Batz |
| 2017/0155724 A1 | 6/2017 | Haddad |
| 2017/0288971 A1 | 10/2017 | Jayaraman |
| 2017/0346704 A1 | 11/2017 | Strijkers |
| 2018/0062943 A1 | 3/2018 | Djukic |

OTHER PUBLICATIONS

Elek et al., "Network Function Chaining in DCs: the Unified Recurring Control Approach," 2015 Fourth European Workshop on Software Defined Networks (EWSDN), Sep. 30-Oct. 2, 2015, IEEE.
Borcoci, Eugen, "Network Function Virtualization and Software Defined Networking Cooperation," InfoSys 2015 Conference, May 24-29, 2015.
U.S. Office Action dated Jun. 13, 2018 in U.S. Appl. No. 15/133,629.
U.S. Office Action dated Dec. 13, 2018 in U.S. Appl. No. 15/133,629.
U.S. Notice of Allowance dated May 6, 2019 in U.S. Appl. No. 15/133,629.
U.S. Notice of Allowance dated Jun. 26, 2019 in U.S. Appl. No. 15/133,629.

* cited by examiner

DISCOVERY AND CHAINING OF VIRTUAL FUNCTIONS

CROSS-REFERENCE TO RELATED APPLICATIONS

This application is a continuation of and claims priority to U.S. patent application Ser. No. 15/133,629, entitled "Discovery and Chaining of Virtual Functions," filed Apr. 20, 2016, now U.S. Pat. No. 10,430,258, which is incorporated herein by reference in its entirety.

BACKGROUND

Virtualization of network resources has been introduced and embraced over the past several years by various types of networks. Through virtualization, some networks can be provided with greater elasticity to react and/or address demand shifts, lulls, and/or spikes. In particular, virtualization can enable quick creation and scaling of applications to address demand changes, whereas traditional network planning can entail always operating applications and other resources at levels that satisfy a highest-anticipated demand for the applications.

In one approach to virtualization, network appliances can be emulated by virtual copies of the network appliances, which can include one or more virtual functions operating on a host or node such as a virtual machine. Thus, instead of a physical server with a specific application being deployed to a network for a particular purpose, virtualization can instead enable creating a virtual version of the physical server as a virtual machine, and deploying the application to the virtual machine as a service, application, or number of virtual functions.

Virtualization therefore breaks the traditional tie between hardware and custom software. Instead, custom software can be deployed to commercial-off-the-shelf ("COTS") hardware. This, in turn, can help reduce costs and lead time for deploying an application since custom applications and custom hardware do not have to be ordered and deployed to a network. Also, this approach can enable flexibility in terms of scaling, locating, and/or using the services.

SUMMARY

The present disclosure is directed to discovery and chaining of virtual functions. A computing device can receive a request to create or scale an application. In some embodiments, the request can be created or submitted by a requestor via a web portal, an application programming interface ("API"), user interface, or other functionality associated with the computing device. The computing device can analyze the application request and determine, based upon the application request, what type of application is requested by the application request, as well as an application topology for the application, in some embodiments. The application creation module can access application templates, rules, and/or policies to create the application topology, which can identify two or more virtual functions that will provide the functionality of the application, as well as a definition of how data will flow to, among, through, and/or from the two or more virtual functions.

The application creation module can generate one or more commands for creating and/or instantiating the determined virtual functions. The commands can be executed by a processor (e.g., a processor associated with a computing environment such as a data center, a computer, a server farm, or the like) to create the virtual functions. The virtual functions can be configured to announce their capabilities via one or more capabilities announcements, as well as chain themselves together in response to execution of one or more chaining commands. According to various embodiments, the virtual functions can announce their capabilities via one or more capabilities announcements and receive one or more chaining commands that can be used to chain themselves together. Thus, some embodiments of the concepts and technologies described herein can obviate the need for other entities to chain together the one or more virtual functions associated with the application.

According to one aspect of the concepts and technologies disclosed herein, a system is disclosed. The system can include a processor and a memory. The memory can store computer-executable instructions that, when executed by the processor, cause the processor to perform operations. The operations can include receiving an application request from a requestor, the application request including a request to create an application; determining, based upon the application request, an application topology associated with the application, the application topology defining two or more virtual functions and a data flow among the two or more virtual functions; triggering creation of the two or more virtual functions in a computing environment; receiving, from the two or more virtual functions, an indication of capabilities of the two or more virtual functions; and initiating chaining of the two or more virtual functions. The indication of the capabilities can be generated by the plurality of virtual functions.

In some embodiments, the system also can include an application programming interface and an application request can be received via the application programming interface. In some embodiments, the application request can be created via a web portal. In some embodiments, triggering creation of the two or more virtual functions can include creating a command and sending the command to a device associated with the computing environment. In some embodiments, the operations further can include determining how the two or more virtual functions should be chained. In some embodiments, determining the chaining can include determining the chaining based upon the application topology.

In some embodiments, determining the chaining can include determining the chaining based upon the application topology; a library including an application template, a policy, and a rule; and the indication of capabilities. In some embodiments, the indication of capabilities can include a capabilities announcement sent by the two or more virtual functions. In some embodiments, initiating the chaining can include sending a chaining command to the two or more virtual functions. In some embodiments, the two or more virtual functions can be configured to chain themselves. In some embodiments, the operations further can include initiating activation of the application.

According to another aspect of the concepts and technologies disclosed herein, a computer storage medium is disclosed. The computer storage medium can have computer-executable instructions stored thereon that, when executed by a processor, cause the processor to perform operations. The operations can include receiving an application request from a requestor, the application request including a request to create an application; determining, based upon the application request, an application topology associated with the application, the application topology defining two or more virtual functions and a data flow among the two or more virtual functions; triggering creation of the two or more virtual functions in a computing environment; receiving, from the two or more virtual functions, an indication of capabilities of the two or more virtual functions; and initiating chaining of the two or more virtual functions. The indication of the capabilities can be generated by the plurality of virtual functions.

In some embodiments, triggering creation of the two or more virtual functions can include creating a command and sending the command to a device associated with the computing environment. In some embodiments, the operations further can include determining how the two or more virtual functions should be chained based upon the application topology. In some embodiments, the two or more virtual functions can be configured to chain themselves together to provide functionality associated with the application.

According to one aspect of the concepts and technologies disclosed herein, a method is disclosed. The method can include receiving, by a processor that executes an application creation module, an application request from a requestor, the application request including a request to create an application; determining, by the processor and based upon the application request, an application topology associated with the application, the application topology defining two or more virtual functions and a data flow among the two or more virtual functions; triggering, by the processor, creation of the two or more virtual functions in a computing environment; receiving, by the processor and from the two or more virtual functions, an indication of capabilities of the two or more virtual functions; and initiating, by the processor, chaining of the two or more virtual functions. The indication of the capabilities can be generated by the plurality of virtual functions.

In some embodiments, triggering creation of the two or more virtual functions can include creating a command and sending the command to a device associated with the computing environment. In some embodiments, the method also can include determining how the two or more virtual functions should be chained based upon the application topology. In some embodiments, the method also can include determining how the two or more virtual functions should be chained based upon the application topology; a library including an application template, a policy, and a rule; and the indication of capabilities. In some embodiments, the two or more virtual functions can be configured to chain themselves together to provide functionality associated with the application.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

The following detailed description is directed to discovery and chaining of virtual functions. A computing device can receive a request to create or scale an application. In some embodiments, the request can be created or submitted by a requestor via a web portal, API, user interface, or other functionality associated with the computing device. The computing device can analyze the application request and determine, based upon the application request, what type of application is requested by the application request, as well as an application topology for the application, in some embodiments. The application creation module can access application templates, rules, and/or policies to create the application topology, which can identify two or more virtual functions that will provide the functionality of the application, as well as a definition of how data will flow to, among, through, and/or from the two or more virtual functions.

The application creation module can generate one or more commands for creating and/or instantiating the determined virtual functions. The commands can be executed by a processor (e.g., a processor associated with a computing environment such as a data center, a computer, a server farm, or the like) to create the virtual functions. The virtual functions can be configured to announce their capabilities via one or more capabilities announcements, as well as chain themselves together in response to execution of one or more chaining commands. According to various embodiments, the virtual functions can announce their capabilities via one or more capabilities announcements and receive one or more chaining commands that can be used to chain themselves together. Thus, some embodiments of the concepts and technologies described herein can obviate the need for other entities to chain together the one or more virtual functions associated with the application.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
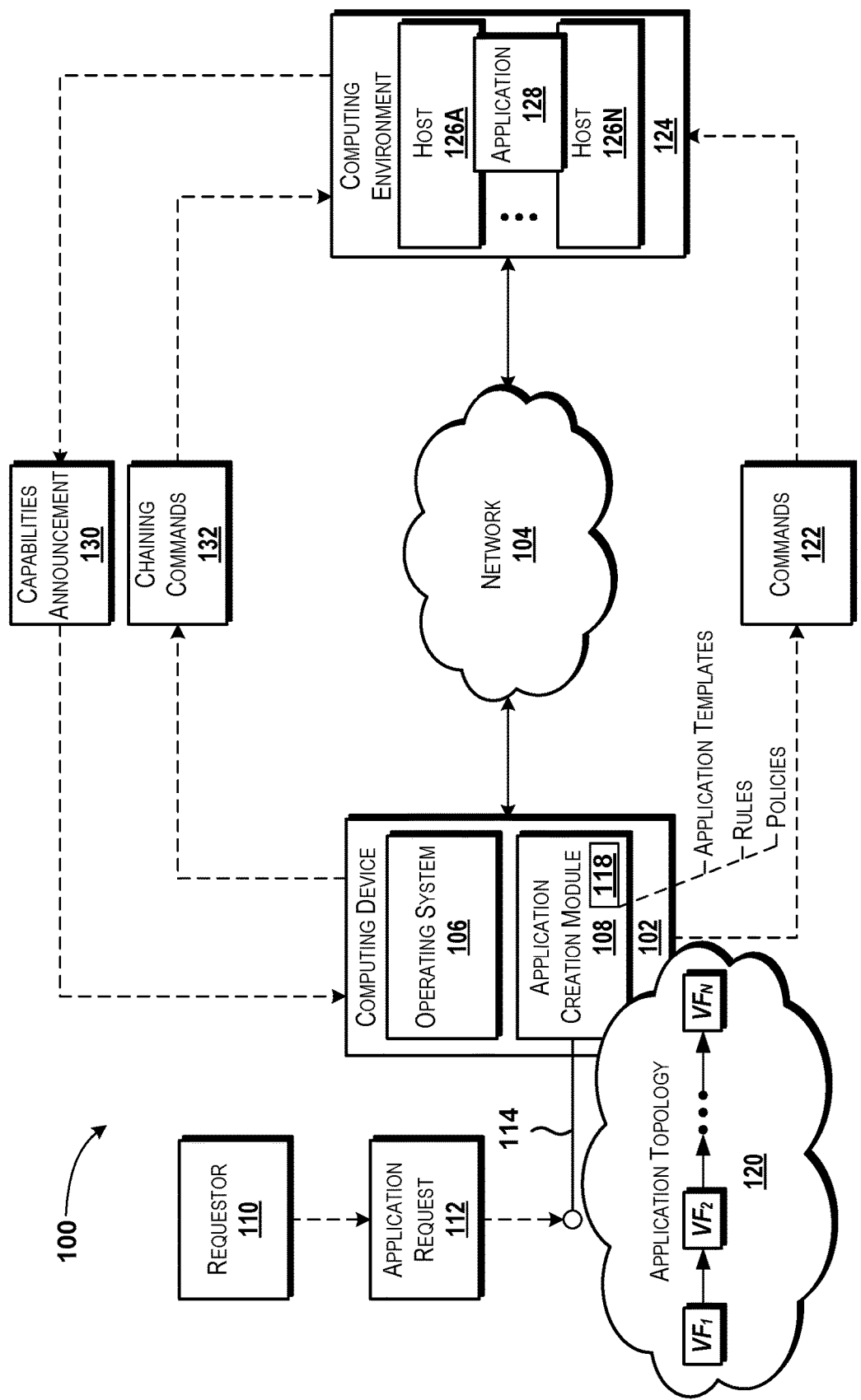
FIG. 1 is a system diagram illustrating an illustrative operating environment for various embodiments of the concepts and technologies described herein.

Referring now to FIG. 1, aspects of an operating environment 100 for various embodiments of the concepts and technologies disclosed herein for discovering and chaining virtual functions will be described, according to an illustrative embodiment. The operating environment 100 shown in FIG. 1 includes a computing device 102. The computing device can operate in communication with and/or as part of a communications network ("network") 104, though this is not necessarily the case. Additional details of the network 104 are illustrated and described below with reference to FIG. 4.

According to various embodiments, the functionality of the computing device 102 may be provided by one or more server computers, desktop computers, mobile telephones, smartphones, laptop computers, embedded computing systems, other computing systems, and the like. It should be understood that the functionality of the computing device 102 can be provided by a single device, by two or more similar devices, and/or by two or more dissimilar devices. For purposes of describing the concepts and technologies disclosed herein, the computing device 102 is described herein as a server computer. It should be understood that this embodiment is illustrative, and should not be construed as being limiting in any way.

The computing device 102 can execute an operating system 106 and one or more application programs such as, for example, an application creation module 108. The operating system 106 can include a computer program for controlling the operation of the computing device 102. The application creation module 108 can include an executable program configured to execute on top of the operating system 106 to provide various functions illustrated and described herein for discovering and chaining virtual functions. In particular, as will be explained in more detail below, some embodiments of the application creation module 108 can be configured to instantiate self-discovering and self-chaining virtual functions. Although the application creation module 108 is illustrated as being executed by the computing device 102, it should be understood that the application creation module 108, as well as functionality thereof, may be embodied as or in stand-alone devices or components operating as part of or in communication with the network 104 and/or the computing device 102. As such, the illustrated embodiment should be understood as being illustrative of only some contemplated embodiments and should not be construed as being limiting in any way.

As shown in FIG. 1, the operating environment 100 can include a requestor 110. The requestor 110 can correspond to any computing device, user device, or other device that can be associated with a network operator, a network engineer, a customer, or other users or entities. In some embodiments, the requestor 110 also can correspond to a user of the application creation module 108 including, but not limited to, network operators, engineers, managers, or the like; customers; applications, services, or other modules or programs; combinations thereof; or the like. As such, the requestor 110 can correspond to almost any hardware or software associated with almost any entity. As such, it should be understood that the above-listed examples are illustrative and therefore should not be construed as being limiting in any way.

The requestor 110 can communicate with the computing device 102 via various types of hardware, software, and/or networking functionality. In some embodiments, the requestor 110 can communicate with the computing device 102 via one or more web portals, service calls, application or program commands, combinations thereof or the like. In the illustrated embodiment, the requestor 110 can create a communication to request creation of an application ("application request") 112. The application request 112 can correspond to a request or service call to create or scale a particular application, module, or the like, as will be illustrated and described in more detail hereinbelow.

According to various embodiments of the concepts and technologies described herein, the application request 112 can be submitted to the application creation module 108 via one or more web portals, user interfaces, application programming interfaces ("APIs"), or other functionality 114 (hereinafter referred to as an "API 114" for clarity), which can be exposed by the computing device 102, the application creation module 108, and/or other devices, software, and/or other entities to enable submission and/or creation of the application request 112. Because the application request 112 can be created in additional and/or alternative ways, it should be understood that this example is illustrative and therefore should not be construed as being limiting in any way.

The application request 112 can be used to trigger or request creation of an application associated with the application request 112, to trigger or request scaling of an application associated with the application request 112, or the like. Because creation or scaling of an application can be requested in other ways, and because the application request 112 can be created and/or submitted to the application creation module 108 in additional and/or alternative manners, it should be understood that the illustrated embodiment is illustrative and should not be construed as being limiting in any way.

As will be explained in more detail below, the application creation module 108 can analyze the application request 112 and/or otherwise determine, based upon the application request 112, functionality that is to be created as part of an application being requested by way of the application request 112. In some embodiments, for example, the application creation module 108 can access a library 118. The library 118 can store application templates (e.g., templates that define applications and/or functions and functionality associated with applications); rules and/or policies for chaining functions and/or functionality associated with applications; other types of information; combinations thereof; or the like. Although the library 118 is shown as a component of the application creation module 108, it should be understood that the library 118 can be stored separately from the application creation module 108 at the computing device 102 and/or stored remotely from the computing device 102 and/or the application creation module 108 in various embodiments. As such, the illustrated embodiment is illustrative and should not be construed as being limiting in any way.

Based on the application templates and/or other information, the application creation module 108 can determine an application topology 120 associated with the application being requested by way of the application request 112. The application topology 120 can define one or more virtual functions (labeled $VF_1$, $VF_2$, $VF_n$ in FIG. 1 for illustration) associated with the application being requested by the application request 112, as well as how data will flow through the one or more virtual functions. According to various embodiments, the computing device 102 can create one or more commands 122 to create the virtual functions associated with the application being requested by the application request 112. It should be understood that this example is illustrative and therefore should not be construed as being limiting in any way.

According to various embodiments, the computing device 102 can distribute the commands 122 to a computing environment 124. The computing environment 124 can correspond, in some embodiments, to a data center, a server farm, a distributed computing environment such as a cloud computing platform, or the like. The computing environment 124 also can correspond, in some other embodiments, to a single computing device such as a server computer, or the like. In yet other embodiments, the computing environment 124 can correspond to a multi-processor and/or multicore processing system, a disk array, a personal computer, or the like. Thus, the computing environment 124 can correspond to one or more computing devices having one or more data storage devices and/or one or more processing devices. It should be understood that these examples are illustrative and therefore should not be construed as being limiting in any way.

According to various embodiments of the concepts and technologies described herein, the computing environment 124 can include two or more hosts 126A-N (hereinafter collectively and/or generically referred to as "hosts 126"). The hosts 126 can correspond, in some embodiments, to virtual machines. As used herein, the term "node" can be used to refer to a virtual machine or other host that can execute or host an application function, a control function, or other functionality associated with an application. It should be understood that this example is illustrative and therefore should not be construed as being limiting in any way.

The hosts 126 can execute and/or host one or more virtual network functions and/or one or more virtual functions (e.g., application functions, or the like). Thus, it can be appreciated that the hosts 126 can provide one or more nodes of an application such as the application 128 shown in FIG. 1. It also can be appreciated from FIG. 1 that the application 128 can be distributed across one or more of the hosts 126, though this is not necessarily the case. According to various embodiments, the commands 122 can instruct the computing environment 124 and/or functionality associated therewith (e.g., an orchestrator, a control function, or the like) to instantiate or dedicate resources for the application 128 including, but not limited to, the hosts 126. It should be understood that this example is illustrative and therefore should not be construed as being limiting in any way.

As shown in FIG. 1, the application creation module 108 can be configured to generate one or more commands 122. The commands 122 can correspond to instructions that, when executed by a processor associated with the computing environment 124 (e.g., not separately shown in FIG. 1), cause the processor to instantiate and/or activate the application 128. Thus, as will be explained in more detail below, particularly with reference to FIGS. 2-3, the commands 122 can be issued to create and/or instantiate virtual functions associated with the application 128, to initiate chaining of the virtual functions associated with the application 128, to initiate instantiation of the application 128 in a service layers, and/or the like. It should be understood that this example is illustrative and therefore should not be construed as being limiting in any way.

According to various embodiments of the concepts and technologies described herein, the virtual functions created in accordance with the concepts and technologies described herein can be configured to announce one or more capabilities associated with the virtual functions. The virtual functions can be configured to announce these capabilities, in some embodiments, upon creation and/or instantiation (e.g., at run time) and/or at other times. In particular, the virtual functions can be configured to create a message or other type of announcement ("capabilities announcement") 130. According to various embodiments of the concepts and technologies described herein, each virtual function created by the application creation module 108 (and/or at the initiation of the application creation module 108) can be configured to generate a capabilities announcement 130. As such, it can be appreciated that multiple capabilities announcements 130 may be generated for a particular application 128.

The computing device 102 can receive the capabilities announcement 130 from the virtual function(s). According to various embodiments, the application creation module 108 can access the library 118 and/or the application topology 120 referenced earlier to determine chaining for the virtual functions associated with the application 128. Thus, the application creation module 108 can be configured to determine, based on the library 118, the application topology 120, and/or the capabilities announcement(s) 130, how the virtual functions should be chained together to provide the functionality associated with the application 128.

More particularly, as noted above, the library 118 can store application templates, rules, policies, and other information. Similarly, the application topology 120 can indicate two or more virtual functions associated with the application 128, as well as how data flows through and/or between the virtual functions. Thus, the capabilities announcement(s) 130 can indicate, for particular virtual functions, their capabilities. Thus, in combination with the library 118 (e.g., the templates, rules, and policies) and/or the application topology 120, the capabilities announcement(s) 130 can be used to identify how and where specific virtual functions provide functionality associated with the application 128 and/or how each particular virtual function receives and/or sends data as part of a data flow associated with the application 128. Thus, the library 118, the application topology 120, and/or the capabilities announcement(s) 130, can be used by the application creation module 108 to define the specific chaining for the virtual functions to provide the desired functionality of the application 128. It should be understood that this example is illustrative and therefore should not be construed as being limiting in any way.

The application creation module 108 can generate one or more chaining commands 132. The chaining commands 132 can define how the virtual functions should chain themselves to each other to provide the functionality associated with the application 128. The chaining commands 132 can include computer-executable instructions that, when executed by a processor associated with the computing environment 124 (the processor is not separately labeled in FIG. 1), can cause the virtual functions to chain themselves to one another to provide the functionality associated with the application 128. Thus, it can be appreciated that embodiments of the concepts and technologies described herein can be used to enable virtual functions to chain themselves without direct involvement from the computing device 102 (e.g., without the computing device 102 performing the chaining). It should be understood that this example is illustrative and therefore should not be construed as being limiting in any way.

In practice, a computing device such as the computing device 102 can receive a request to create or scale an application 128. In some embodiments, the request can be provided to the computing device 102 as the application request 112, which can be submitted to or created at the computing device 102 via a web portal, API, user interface, or other functionality. The computing device 102 can analyze the application request 112 and determine, based upon the application request 112, what type of application 128 is requested by the application request 112, as well as an application topology 120 for the application 128. According to various embodiments as illustrated and described herein, the application creation module 108 can access application templates, rules, and/or policies to create the application topology 120. The application topology 120 can identify two or more virtual functions that will provide the functionality of the application 128, as well as a definition of how data will flow to, among, through, and/or from the two or more virtual functions. As noted above, the application topology 120 is not necessarily created in all embodiments, and as such, it should be understood that this example is illustrative and therefore should not be construed as being limiting in any way.

The application creation module 108 can generate, based upon the application request 112 and/or the determined application topology 120, one or more commands 122 for creating and/or instantiating the determined virtual functions. According to various embodiments, the commands 122 can be executed by a processor to create the virtual functions, where the virtual functions are configured to announce their capabilities via one or more capabilities announcements 130, as well as chain themselves together in response to execution of one or more chaining commands 132. Thus, the virtual functions can announce their capabilities via one or more capabilities announcements 130, receive one or more chaining commands 132, and chain themselves together. Thus, embodiments of the concepts and technologies described herein can obviate the need for other entities (e.g., the computing device 102) to chain together the one or more virtual functions associated with the application 128. It should be understood that this example is illustrative and therefore should not be construed as being limiting in any way.

The application 128, when operational, can provide various types of functionality associated with applications, services, or the like. According to various embodiments, the application 128 can be provided by two or more virtual functions installed on one or more host 126. As such, the application 128 can be hosted by one or more hosts 126 and therefore can include a distributed application. It should be understood that this example is illustrative and therefore should not be construed as being limiting in any way.

FIG. 1 illustrates one computing device 102, one network 104, one requestor 110, one computing environment 124, two hosts 126, and one application 128. It should be understood, however, that various implementations of the operating environment 100 can include zero, one, or more than one computing device 102; zero, one, or more than one network 104; zero, one, or more than one requestor 110; zero, one, or more than one computing environment 124; zero, one, two, or more than two hosts 126; and/or zero, one, or more than one application 128. As such, the illustrated embodiment should be understood as being illustrative, and should not be construed as being limiting in any way.

Figure 2:
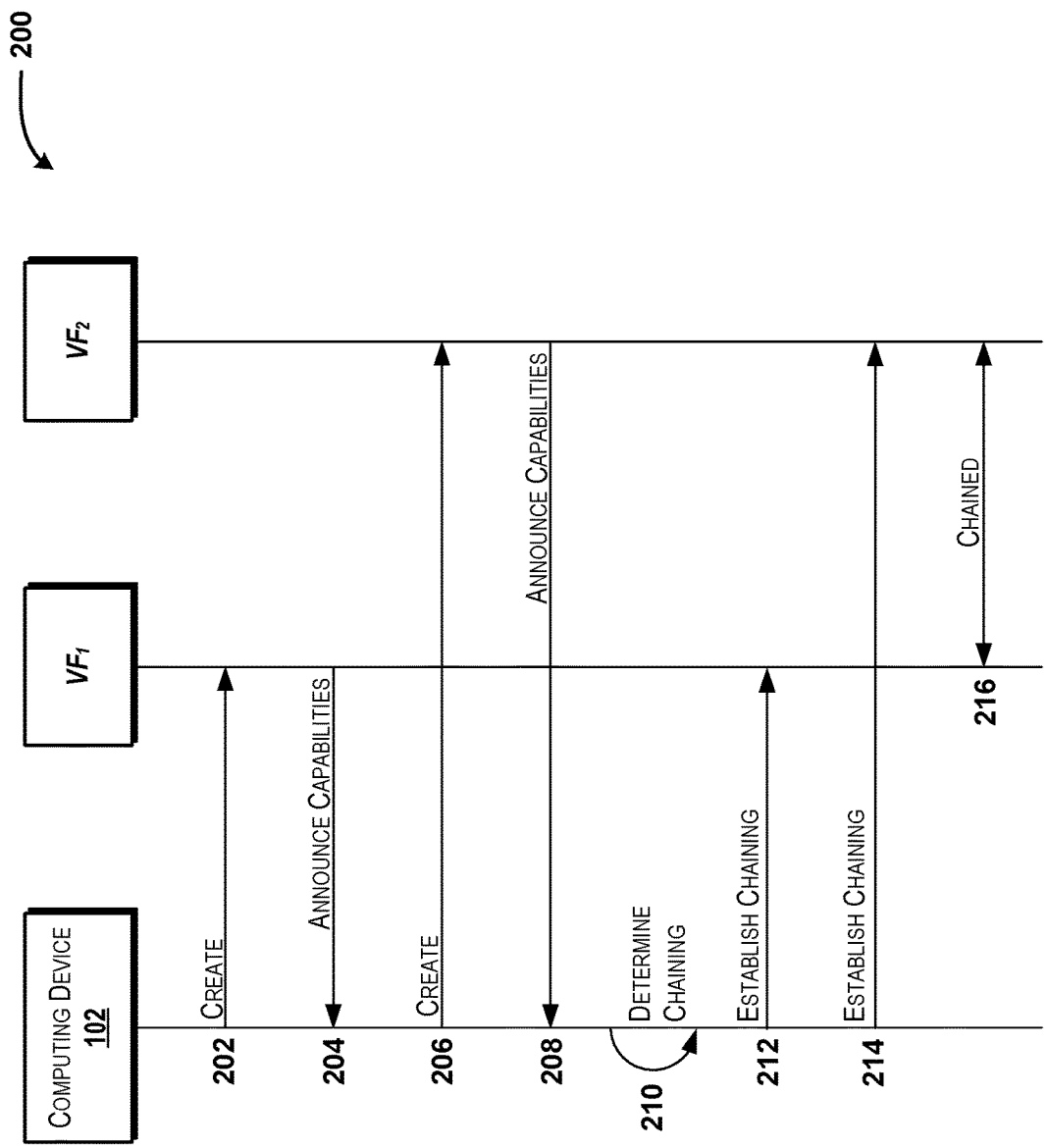
FIG. 2 is a flow diagram showing aspects of a method for discovering and chaining virtual functions, according to an illustrative embodiment of the concepts and technologies described herein.

Turning now to FIG. 2, aspects of a method 200 for discovering and chaining virtual functions will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the computing device 102 or the computing environment 124, to perform one or more operations and/or causing the processor to direct other components of the computing system or device to perform one or more of the operations.

For purposes of illustrating and describing the concepts of the present disclosure, the method 200 is illustrated and described as being performed by the computing device 102 via execution of one or more software modules such as, for example, the application creation module 108; as well as two virtual functions, the functionality of which can be provided by a processor of the computing environment 124 executing one or more software modules. It should be understood that additional and/or alternative devices and/or network nodes can provide the functionality described herein via execution of one or more modules, applications, and/or other software. Furthermore, it should be understood that the illustrated embodiment of two virtual functions is a simple embodiment described for clarity. More than two virtual functions can be included in various embodiments and therefore this embodiment is illustrative, and should not be viewed as being limiting in any way.

The method 200 begins at operation 202. At operation 202, the computing device 102 can create the first virtual function $VF_1$. As explained above with reference to FIG. 1, and as will be more clearly understood with reference to FIG. 3, the computing device 102 can create the first virtual function $VF_1$ at various times and/or in response to various types of input. For example, the computing device 102 can create the first virtual function $VF_1$ in response to receiving an application request 112 from a requestor 110 as illustrated and described above with reference to FIG. 1. Also, as explained above, the computing device 102 can access the library 118 and/or determine an application topology 120, though this is not separately shown in FIG. 2, and although this is not required in all embodiments.

It can be appreciated that operation 202 can correspond to the computing device 102 generating one or more commands 122 and providing those commands 122 to the computing environment 124 as illustrated and described above, though these operations also are not separately shown in FIG. 2. Thus, operation 202 can correspond to creation of the first virtual function $VF_1$ in various manners as illustrated and described herein.

From operation 202, the method 200 can proceed to operation 204. At operation 204, the first virtual function $VF_1$ can announce its capabilities to the computing device 102. As illustrated and described with reference to FIG. 1, operation 204 can correspond to the first virtual function $VF_1$ sending a capabilities announcement 130 to the computing device 102. Also, it can be appreciated that operation 204 can correspond to the computing device 102 receiving a capabilities announcement 130 from the first virtual function $VF_1$. Because the first virtual function $VF_1$ can be configured to announce its capabilities in additional and/or alternative ways, it should be understood that this example is illustrative and therefore should not be construed as being limiting in any way.

From operation 204, the method 200 can proceed to operation 206. At operation 206, the computing device 102 can create the second virtual function $VF_2$. Creation of the second virtual function $VF_2$ can be substantially similar to creation of the first virtual function $VF_1$, though this is not necessarily the case. Thus, operation 206 can correspond to the computing device 102 generating one or more commands 122 and providing those commands 122 to the computing environment 124 as illustrated and described above. Thus, operation 206 can correspond to creation of the second virtual function $VF_2$ in various manners as illustrated and described herein.

From operation 206, the method 200 can proceed to operation 208. At operation 208, the second virtual function $VF_2$ can announce its capabilities to the computing device 102. As illustrated and described with reference to FIG. 1, operation 208 can correspond to the second virtual function $VF_2$ sending a capabilities announcement 130 to the computing device 102. Also, it can be appreciated that operation 208 can correspond to the computing device 102 receiving a capabilities announcement 130 from the second virtual function $VF_2$. Because the second virtual function $VF_2$ can be configured to announce its capabilities in additional and/or alternative ways, it should be understood that this example is illustrative and therefore should not be construed as being limiting in any way.

From operation 208, the method 200 can proceed to operation 210. At operation 210, the computing device 102 can determine chaining for the virtual functions created in operations 202 and 206. It can be appreciated that chaining can be determined for any number of virtual functions created in embodiments of the method 200 in which more than two virtual functions are created. Thus, as illustrated and described above with reference to FIG. 1, the computing device 102 can determine chaining based on an application topology 120, if created; rules and/or policies from the library 118; the capabilities announcements 130 and/or other communications associated with operations 204 and 208; and/or otherwise can determine the chaining for the virtual functions. It can be appreciated that the chaining can identify which virtual functions are chained to each other, as well as a direction of data flow from one virtual function to another virtual function.

Although not separately illustrated in FIG. 2, it should be understood that the computing device 102 can generate one or more chaining commands 132 as part of operation 210. Again, the chaining commands 132 can identify not only what virtual function is chained to what other virtual function, but also a direction of data flow associated with that chaining. Because the chaining commands 132 can reflect other aspects of the chained virtual functions, it should be understood that this example is illustrative and therefore should not be construed as being limiting in any way.

From operation 210, the method 200 can proceed to operation 212. At operation 212, the computing device 102 can trigger establishment of a chaining associated with the first virtual function $VF_1$. As noted above, according to various embodiments of the concepts and technologies described herein, the computing device 102 does not actually establish the chaining between virtual functions, but rather can be configured to trigger (or indirectly trigger) the chaining by, for example, sending chaining commands 132. According to various embodiments, for example, operation 212 can correspond to the computing device 102 sending a chaining command 132 to the first virtual function $VF_1$. In some other embodiments, the computing device 102 can effectively instruct the first virtual function $VF_1$ to chain itself to an appropriate virtual function, so this embodiment is illustrative. It can be appreciated that the computing device 102 therefore does not actually chain the virtual functions together, according to various embodiments. It can be appreciated that the first virtual function $VF_1$ can complete the chaining, and as such, some of the functionality of operation 212 can be completed by the first virtual function $VF_1$. It should be understood that this example is illustrative and therefore should not be construed as being limiting in any way.

From operation 212, the method 200 can proceed to operation 214. At operation 214, the computing device 102 can trigger establishment of a chaining associated with the second virtual function $VF_2$. According to various embodiments, operation 214 can correspond to the computing device 102 sending a chaining command 132 to the second virtual function $VF_2$. In some other embodiments, the computing device 102 can effectively instruct the second virtual function $VF_2$ to chain itself to an appropriate virtual function, as explained above with reference to operation 212. Again, it can be appreciated that the computing device 102 does not directly chain the virtual functions together in various embodiments of the concepts and technologies described herein. It can be appreciated that the second virtual function $VF_2$ can complete the chaining, and as such, some of the functionality of operation 214 can be completed by the second virtual function $VF_2$. It should be understood that this example is illustrative and therefore should not be construed as being limiting in any way.

From operation 214, the method 200 can proceed to operation 216. In operation 216, the first virtual function $VF_1$ and the second virtual function $VF_2$ can establish chaining between themselves and/or chaining between the first virtual function $VF_1$ and the second virtual function $VF_2$ can be established by other entities. In some embodiments (not shown in FIG. 2), the computing device 102 can also be configured to establish chaining, but these embodiments may not use the chaining commands 132 as illustrated and described herein. Thus, the virtual functions can announce their capabilities, in some embodiments, and the chaining can either be accomplished by the virtual functions themselves (as shown in FIG. 2) or by other entities. Furthermore, it can be appreciated that multiple chaining operations can occur for embodiments of the method 200 where more than two virtual functions are involved. After the chained virtual functions are in place, the application 128 can be active and/or activation of the application 128 can be triggered on a service layer of a network or computing environment. Thus, the method 200 can end after operation 216, in some embodiments. It should be understood that this example is illustrative and therefore should not be construed as being limiting in any way.

Figure 3:
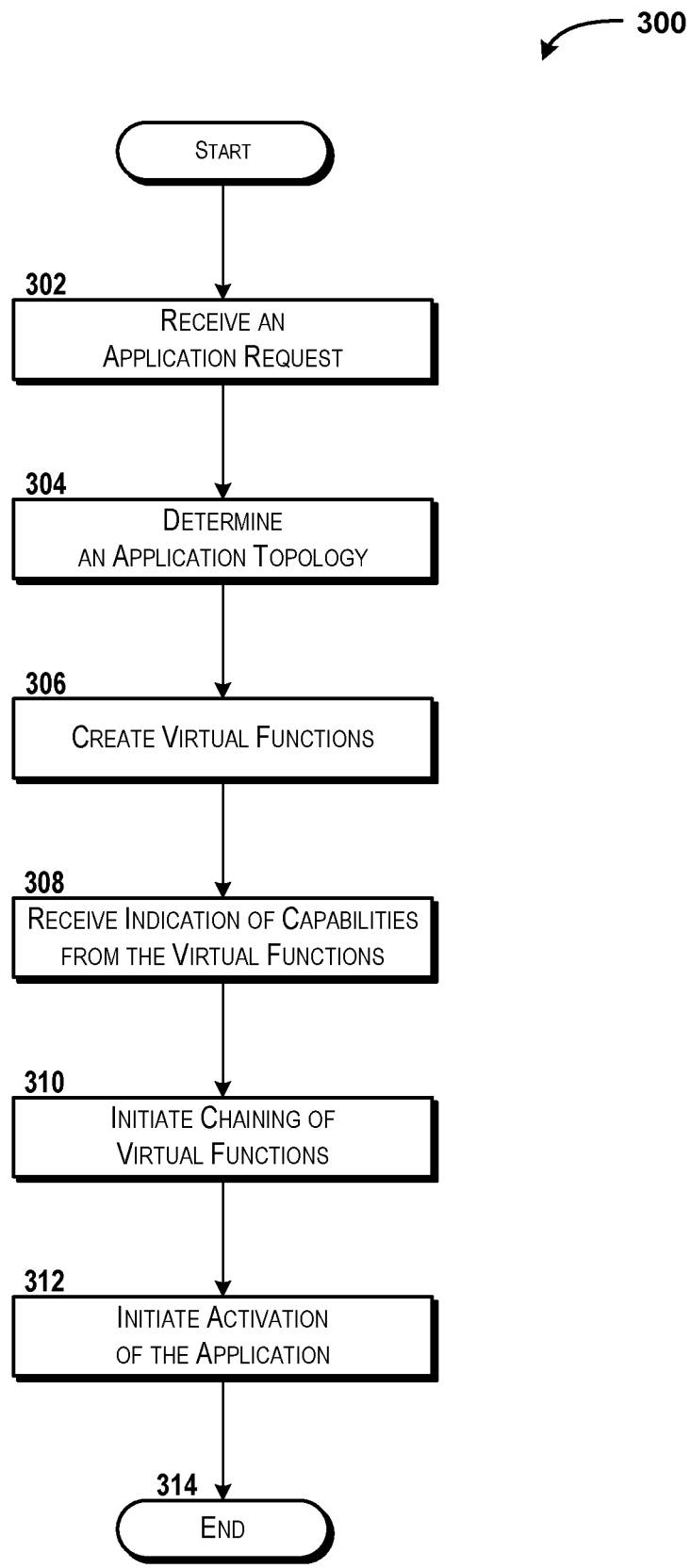
FIG. 3 is a flow diagram showing aspects of a method for discovering and chaining virtual functions, according to another illustrative embodiment of the concepts and technologies described herein.

Turning now to FIG. 3, aspects of a method 300 for discovering and chaining virtual functions will be described in detail, according to another illustrative embodiment. For purposes of illustrating and describing the concepts of the present disclosure, the method 300 disclosed herein is described as being performed by the computing device 102 via execution of one or more software modules such as, for example, the application creation module 108. It should be understood that additional and/or alternative devices and/or network nodes can provide the functionality described herein via execution of one or more modules, applications, and/or other software including, but not limited to, the application creation module 108. Thus, the illustrated embodiments are illustrative, and should not be viewed as being limiting in any way.

The method 300 begins at operation 302. At operation 302, the computing device 102 can receive a request for an application such as the application request 112 illustrated and described with reference to FIG. 1. Thus, the request received in operation 302 can request creation and/or activation of an application such as the application 128 illustrated and described herein, and as such, the request received in operation 302 can correspond to a request to create, activate, or scale an application such as the application 128. It should be understood that this example is illustrative and therefore should not be construed as being limiting in any way.

According to various embodiments of the concepts and technologies described herein, the request received in operation 302 can include data that identifies one or more features and/or components of the application 128 being requested by way of the request received in operation 302 and/or other aspects of operation associated with the application 128. Because the request received in operation 302 can include additional and/or alternative information, it should be understood that this example is illustrative and therefore should not be construed as being limiting in any way.

The request received in operation 302 can be received from various entities including, but not limited to, the requestor 110 illustrated and described with reference to FIG. 1. Thus, the request received in operation 302 can be received from one or more applications, modules, programs, services, devices, entities, or the like, and can be received via one or more portals, user interfaces, APIs, combinations thereof, or the like, for example the API 114 illustrated and described in FIG. 1. It should be understood that the request may not be "received" in operation 302, since the request may be created or submitted via an API, user interface, portal associated with the computing device 102. Thus, operation 302 can include detecting creation of the request, in some embodiments. It should be understood that this example is illustrative and therefore should not be construed as being limiting in any way.

From operation 302, the method 300 can proceed to operation 304. At operation 304, the computing device 102 can determine an application topology 120 associated with the application 128. As noted above, the determination of the application topology 120 is optional in some embodiments. Operation 304 can include the computing device 102 analyzing the request received in operation 302, determining that features and/or scale is desired or requested, and determining how to configure the application 128 based upon these and/or other determinations. It should be appreciated that the computing device 102 may not create the application topology 120 as a model, or the like, and instead can determine the application topology 120 including, but not limited to, determining virtual functions of the application 128, determining a data flow among the virtual functions, combinations thereof, or the like. It also should be understood that the application topology 120 may not be stored or may not persist after being used as illustrated and described herein. Also, the computing device 102 can determine, in operation 304, a number of hosts 126 that are to be instantiated and/or dedicated to provide the functionality of the application 128, though this is not necessarily the case.

From operation 304, the method 300 can proceed to operation 306. At operation 306, the computing device 102 can trigger instantiation of the virtual functions of the application 128. Although not separately shown in FIG. 2, it should be understood that the computing device 102 also can trigger instantiation of one or more hosts 126 that will host the virtual functions of the application 128. The functionality of operation 306 can be provided in various manners.

In some embodiments, for example the embodiment shown in FIG. 1, the computing device 102 can generate and/or transmit one or more commands 122 to a computing environment 124 to trigger instantiation of the virtual functions associated with the application 128. The commands 122 also can instruct other devices or entities, e.g., an orchestrator or orchestration service (not shown in the FIGURES), to instantiate, scale, and/or modify operation of the virtual functions associated with the application 128. In some other embodiments, the computing device 102 can host and/or provide functionality associated with the orchestrator, or the like, and therefore can be configured to instantiate, scale, and/or modify the operation of the application 128 by instantiating and/or activating the virtual functions of the application 128. As such, operation 306 can include the computing device 102 loading virtual functions to the hosts 126, triggering loading of the virtual functions to the hosts 126, and/or otherwise prompting or triggering instantiation of the virtual functions of the application 128.

As explained above in detail, the virtual functions created, instantiated, and/or activated according to various embodiments of the concepts and technologies described herein can be configured to announce their capabilities to each other, to other devices such as the computing device 102, and/or to other entities. According to various embodiments, the virtual functions can be configured to generate a capabilities announcement 130. In some embodiments, the capabilities can be determined with a service discovery protocol ("SDP") instead of, or in addition to, the capabilities announcement 130. In particular, the service discovery protocol can be configured to determine a specific context of virtual functions (e.g., virtual network functions and/or virtual service functions) including where these virtual functions should be located in a data flow, what operations these virtual functions can perform, combinations thereof, or the like. It should be understood that this example is illustrative and therefore should not be construed as being limiting in any way.

From operation 306, the method 300 can proceed to operation 308. At operation 308, the computing device 102 can receive an indication of capabilities from the virtual functions created in operation 306. In particular, the computing device 102 can receive, from two or more virtual functions, a capabilities announcement 130 that defines capabilities of the virtual functions. As noted above, the capabilities announcement 130 can be identified using a service discovery protocol, in some embodiments, whereas in other embodiments the virtual functions can self-report their capabilities and/or context including location within data flows, operations that the virtual functions can perform, combinations thereof, or the like. As such, operation 308 can include the computing device 102 receiving data from the computing environment 124 in the form of capabilities announcements 130; determining capabilities using a service discovery protocol; receiving data from other entities (including the virtual functions themselves); combinations thereof; or the like.

From operation 308, the method 300 can proceed to operation 310. At operation 310, the computing device 102 can initiate chaining of the virtual functions. According to various embodiments, as illustrated and described herein with reference to FIG. 1, the computing device 102 can be configured to analyze the capabilities determined in operation 308 (via the service discovery protocol, receiving the capabilities announcement 130, or the like) to determine how the virtual functions should be chained together. As explained herein, the computing device 102 can make this determination based, at least partially, upon the capabilities announcements 130, the application topology 120 (if created and/or maintained), as well as one or more portions of the library 118 such as the application templates, the rules, the policies, or the like.

In addition to determining the chaining for the virtual functions, the computing device 102 can generate one or more chaining commands 132. As explained herein, the chaining commands 132 can include computer-executable instructions that, when executed by a processor such as a processor of a computing device associated with the computing environment 124, causes the processor to chain virtual functions together, causes the virtual functions to chain themselves together, or prompts other devices to chain the virtual functions together. Thus, it can be appreciated that the chaining commands 132 can be sent to the virtual functions, the computing environment 124, and/or other devices as part of operation 310, and that sending the chaining commands 132 can correspond to initiating the chaining of the virtual functions. As noted above, the computing device 102 can be configured not to directly chain the virtual functions together in accordance with various embodiments of the concepts and technologies described herein. It should be understood that this example is illustrative and therefore should not be construed as being limiting in any way.

Thus, in various embodiments of the concepts and technologies described herein, the virtual functions can be configured to chain themselves to one another based on the capabilities of the various virtual functions. Thus, operation 310 of the method 300 can be omitted, in some embodiments, and/or replaced with an operation for the virtual functions chaining themselves together without involvement from the computing device 102. It should be understood that this example is illustrative and therefore should not be construed as being limiting in any way.

From operation 310, the method 300 can proceed to operation 312. At operation 312, the computing device 102 can initiate activation of the application 128. According to various embodiments, the computing device 102 can determine that the virtual functions are chained together, receive an indication that the virtual functions are chained together, and/or otherwise determine that the virtual functions have been configured to provide the functionality associated with the application 128. Thus, the computing device 102 can be configured to activate the application 128, initiate activation of the application 128 (e.g., by issuing a command 122 to various entities to activate the application 128), or the like.

In some embodiments, the computing device 102 can instruct an orchestrator or other entity to activate the application 128. It should be understood that this example is illustrative and therefore should not be construed as being limiting in any way.

From operation 312, the method 300 can proceed to operation 314. The method 300 can end at operation 314.

From the above description, it can be appreciated that various embodiments of the concepts and technologies described herein can improve creation of applications such as the application 128 by obviating the need for various entities to chain together virtual functions to provide functionality associated with the application 128. In particular, some embodiments of the concepts and technologies described herein include the virtual functions performing operations for discovering their capabilities, announcing their capabilities to other virtual functions and/or other entities (e.g., the computing device 102), and being chained together (or chaining themselves together) without involvement from network operators, managers, engineers, or the like. Thus, embodiments of the concepts and technologies described herein can obviate the need to perform various chaining operations on the virtual functions after creation, thereby streamlining the activation of the application 128 and reducing the time and costs to activate the application 128. It should be understood that this example is illustrative and therefore should not be construed as being limiting in any way.

Figure 4:
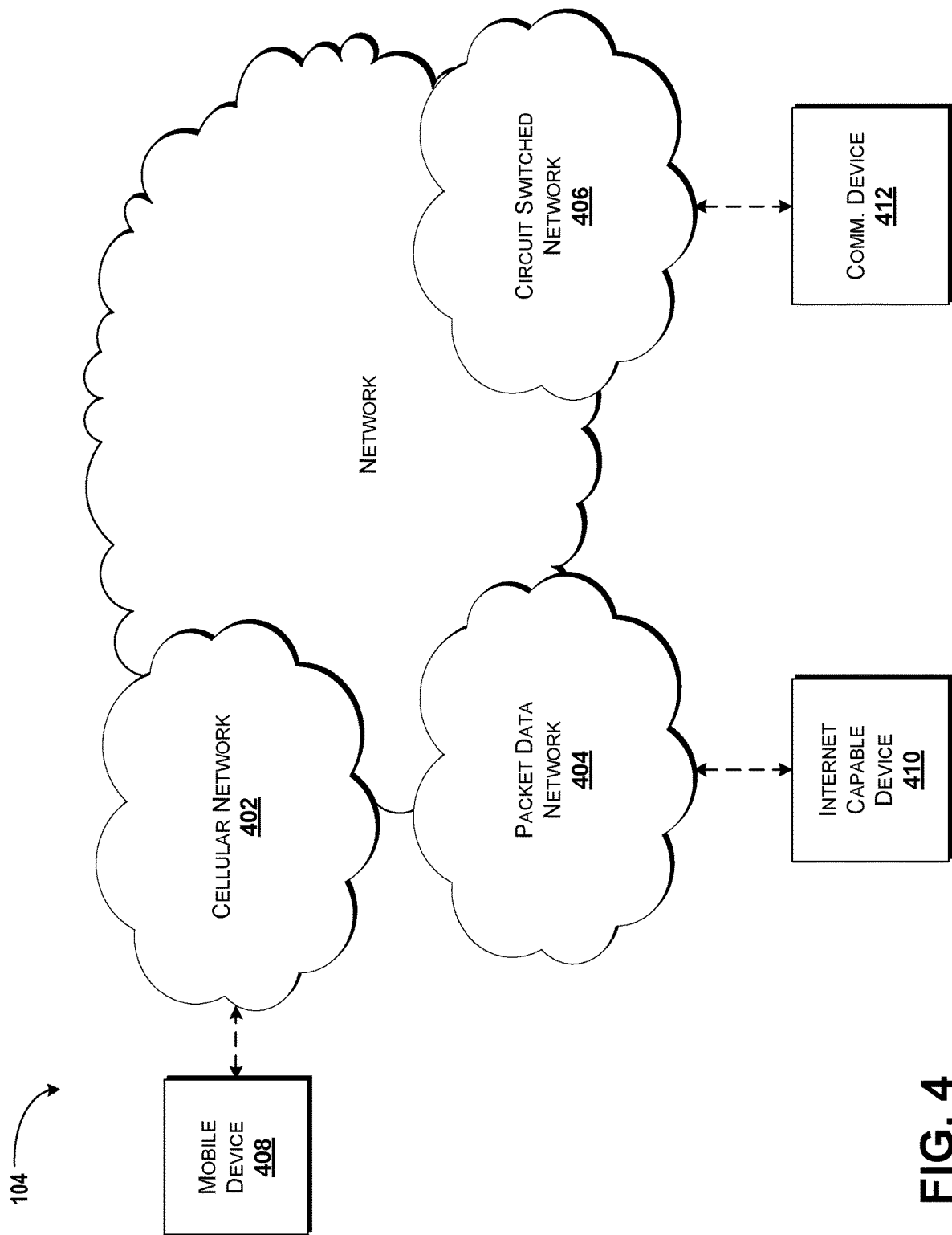
FIG. 4 schematically illustrates a network, according to an illustrative embodiment of the concepts and technologies described herein.

Turning now to FIG. 4, additional details of the network 104 are illustrated, according to an illustrative embodiment. The network 104 includes a cellular network 402, a packet data network 404, for example, the Internet, and a circuit switched network 406, for example, a publicly switched telephone network ("PSTN"). The cellular network 402 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 402 also includes radios and nodes for receiving and transmitting voice, data, and combinations thereof to and from radio transceivers, networks, the packet data network 404, and the circuit switched network 406.

A mobile communications device 408, such as, for example, a cellular telephone, a user equipment, a mobile terminal, a PDA, a laptop computer, a handheld computer, and combinations thereof, can be operatively connected to the cellular network 402. The cellular network 402 can be configured as a 2G GSM network and can provide data communications via GPRS and/or EDGE. Additionally, or alternatively, the cellular network 402 can be configured as a 3G UMTS network and can provide data communications via the HSPA protocol family, for example, HSDPA, EUL (also referred to as HSDPA), and HSPA+. The cellular network 402 also is compatible with 4G mobile communications standards as well as evolved and future mobile standards.

The packet data network 404 includes various devices, for example, servers, computers, databases, and other devices in communication with one another, as is generally known. The packet data network 404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 404 includes or is in communication with the Internet. The circuit switched network 406 includes various hardware and software for providing circuit switched communications. The circuit switched network 406 may include, or may be, what is often referred to as a plain old telephone system (POTS). The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more Internet-capable devices 410, for example, a PC, a laptop, a portable device, or another suitable device, can communicate with one or more cellular networks 402, and devices connected thereto, through the packet data network 404. It also should be appreciated that the Internet-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and therethrough to the packet data network 404 and/or the cellular network 402. It should be appreciated that the communications device 412 can be an Internet-capable device, and can be substantially similar to the Internet-capable device 410. In the specification, the network 104 is used to refer broadly to any combination of the networks 402, 404, 406. It should be appreciated that substantially all of the functionality described with reference to the network 104 can be performed by the cellular network 402, the packet data network 404, and/or the circuit switched network 406, alone or in combination with other networks, network elements, and the like.

Figure 5:
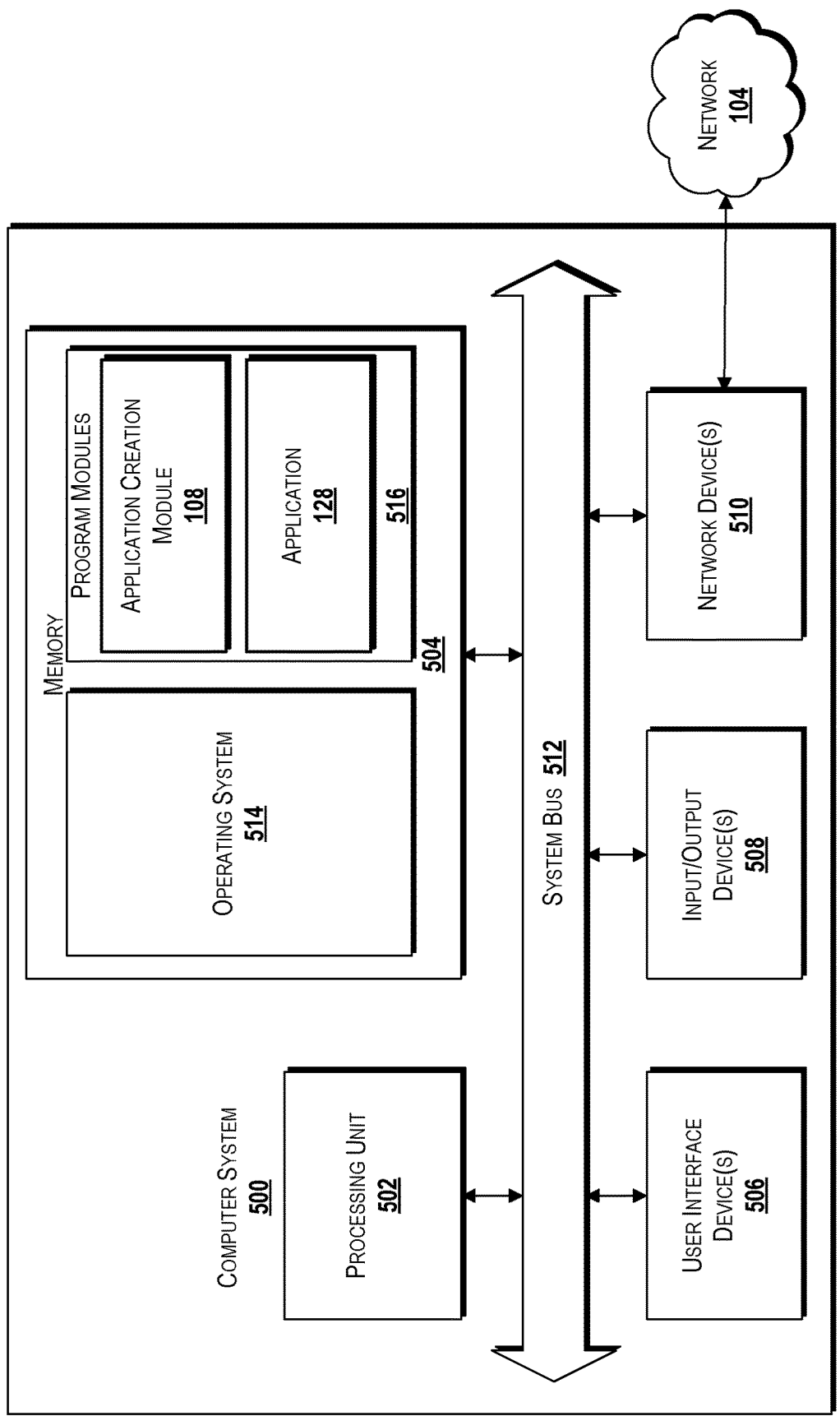
FIG. 5 is a block diagram illustrating an example computer system configured to enable discovery and chaining of virtual functions, according to some illustrative embodiments of the concepts and technologies described herein.

FIG. 5 is a block diagram illustrating a computer system 500 configured to provide the functionality described herein for discovery and chaining of virtual functions, in accordance with various embodiments of the concepts and technologies disclosed herein. The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 516 may include various software and/or program modules described herein. In some embodiments, for example, the program modules 516 can include the application creation module 108 and/or the application 128. This and/or other programs can be embodied in computer-readable media containing instructions that, when executed by the processing unit 502, perform one or more of the methods 200, 300 described in detail above with respect to FIGS. 2-3. According to embodiments, the program modules 516 may be embodied in hardware, software, firmware, or any combination thereof. Although not shown in FIG. 5, it should be understood that the memory 504 also can be configured to store the application request 112, the library 118, the application topology 120, the commands 122, the virtual functions, the capabilities announcements 130, the chaining commands 132, and/or other data, if desired.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network, such as the network 104. Examples of the network devices 510 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for discovery and chaining of virtual functions have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
   a processor; and
   a memory that stores computer-executable instructions that, when executed by the processor, cause the processor to perform operations comprising
      receiving an application request from a requestor,
      determining, based upon the application request, an application topology associated with an application, the application topology defining a plurality of virtual functions and a data flow among the plurality of virtual functions,
      triggering creation of the plurality of virtual functions in a computing environment,
      receiving, from each virtual function of the plurality of virtual functions, an associated indication of capabilities of the virtual function, wherein the indication of the capabilities is generated by the virtual function, and
      initiating chaining of the plurality of virtual functions.

2. The system of claim 1, wherein the computer-executable instructions, when executed by the processor, cause the processor to perform operations further comprising:
   determining how the plurality of virtual functions should be chained.

3. The system of claim 1, wherein the computer-executable instructions, when executed by the processor, cause the processor to perform operations further comprising determining how the plurality of virtual functions should be chained based upon:
   the application topology;
   a library comprising an application template, a policy, and a rule; and
   the indication of the capabilities.

4. The system of claim 1, wherein the application request comprises a request to create the application.

5. The system of claim 1, wherein the application request comprises a request to scale the application.

6. The system of claim 1, wherein the application request comprises a request to activate the application.

7. The system of claim 1, wherein triggering creation of the plurality of virtual functions comprises creating a command and sending the command to a device associated with the computing environment.

8. A computer storage medium having computer-executable instructions stored thereon that, when executed by a processor, cause the processor to perform operations comprising:
   receiving an application request from a requestor;
   determining, based upon the application request, an application topology associated with an application, the application topology defining a plurality of virtual functions and a data flow among the plurality of virtual functions;
   triggering creation of the plurality of virtual functions in a computing environment;
   receiving, from each virtual function of the plurality of virtual functions, an associated indication of capabilities of the virtual function, wherein the indication of the capabilities is generated by the virtual function; and
   initiating chaining of the plurality of virtual functions.

9. The computer storage medium of claim 8, wherein the computer-executable instructions, when executed by the processor, cause the processor to perform operations further comprising:
   determining how the plurality of virtual functions should be chained.

10. The computer storage medium of claim 8, wherein the computer-executable instructions, when executed by the processor, cause the processor to perform operations further comprising determining how the plurality of virtual functions should be chained based upon:
    the application topology;
    a library comprising an application template, a policy, and a rule; and
    the indication of the capabilities.

11. The computer storage medium of claim 8, wherein triggering creation of the plurality of virtual functions comprises creating a command and sending the command to a device associated with the computing environment.

12. The computer storage medium of claim 8, wherein the application request comprises a request to create the application.

13. The computer storage medium of claim 8, wherein the application request comprises a request to scale the application.

14. The computer storage medium of claim 8, wherein the application request comprises a request to activate the application.

15. A method comprising:
- receiving, by a processor that executes an application creation module, an application request from a requestor;
- determining, by the processor and based upon the application request, an application topology associated with an application, the application topology defining a plurality of virtual functions and a data flow among the plurality of virtual functions;
- triggering, by the processor, creation of the plurality of virtual functions in a computing environment;
- receiving, by the processor and from each virtual function of the plurality of virtual functions, an associated indication of capabilities of the virtual function, wherein the indication of the capabilities is generated by the virtual function; and
- initiating, by the processor, chaining of the plurality of virtual functions.

16. The method of claim 15, further comprising:
determining how the plurality of virtual functions should be chained based upon the application topology.

17. The method of claim 15, further comprising determining how the plurality of virtual functions should be chained based upon:
- the application topology;
- a library comprising an application template, a policy, and a rule; and
- the indication of the capabilities.

18. The method of claim 15, wherein the application request comprises a request to create the application.

19. The method of claim 15, wherein the application request comprises a request to scale the application.

20. The method of claim 15, wherein the application request comprises a request to activate the application.

* * * * *